US012283405B2

(12) United States Patent
Zhang et al.

(10) Patent No.: US 12,283,405 B2
(45) Date of Patent: Apr. 22, 2025

(54) LUMINESCENT WIRE

(71) Applicant: Pan Zhang, Jingzhou (CN)

(72) Inventors: Pan Zhang, Jingzhou (CN); Lihua Cai, Jingzhou (CN)

(73) Assignee: Pan Zhang, Jingzhou (CN)

( * ) Notice: Subject to any disclaimer, the term of this patent is extended or adjusted under 35 U.S.C. 154(b) by 54 days.

(21) Appl. No.: 18/320,673

(22) Filed: May 19, 2023

(65) Prior Publication Data

US 2023/0377772 A1 Nov. 23, 2023

(30) Foreign Application Priority Data

May 19, 2022 (CN) ......................... 202221200525.6
Dec. 6, 2022 (CN) ......................... 202223254496.4

(51) Int. Cl.
*F21K 9/00* (2016.01)
*H01B 7/08* (2006.01)
*H01B 7/36* (2006.01)

(52) U.S. Cl.
CPC ................. *H01B 7/36* (2013.01); *F21K 9/00* (2013.01); *H01B 7/08* (2013.01)

(58) Field of Classification Search
CPC ........... F21K 9/00; H01B 7/08; H01B 7/0823; H01B 7/36; G02B 6/00; H02G 3/0481
USPC ........................................... 174/135; 385/147
See application file for complete search history.

(56) References Cited

U.S. PATENT DOCUMENTS

2005/0074223 A1* 4/2005 Moore ................. H02G 3/0481 385/147

FOREIGN PATENT DOCUMENTS

| | | | | |
|---|---|---|---|---|
| CN | 107461639 A | * 12/2017 | ................ | F21S 4/24 |
| CN | 209880986 U | * 12/2019 | ........... | H01R 13/717 |
| GB | 2079300 A | * 1/1982 | ............ | A61K 8/062 |
| JP | 2017008163 A | * 1/2017 | ............... | C08K 3/36 |

* cited by examiner

*Primary Examiner* — Timothy J Thompson
*Assistant Examiner* — Guillermo J Egoavil

(57) ABSTRACT

Disclosed is a luminescent wire. The luminescent wire includes a silicone sleeve, a luminescent light bar and a flat cable, the silicone sleeve is internally provided with wire holes, the wire holes penetrate through the silicone sleeve along a longitudinal direction, each of the wire holes is used for one group of the flat cables to pass through, an end portion of the flat cable is connected to a plug or a socket, the flat cables inside each of the silicone sleeves may be used alone, or the plurality of the silicone sleeves may be selected to be used side by side, as to form different specifications of the luminescent wires. An accommodating hole is arranged above the wire holes, used to accommodate the luminescent light bar, the silicone sleeve is provided with a light transmitting area. The luminescent wire may also be conveniently viewed and used in darker environments.

8 Claims, 11 Drawing Sheets

LUMINESCENT WIRE

TECHNICAL FIELD

The present application relates to the technical field of computer flat cables, in particular to a luminescent wire.

BACKGROUND

A computer, is a modern electronic computing machine used for high-speed computing. It may perform both numerical computation and logical computation, has the function of storage and memory, and is a modern intelligent electronic device that may run according to programs and process massive data automatically at the high speed.

During use of the computers, in order to satisfy the diversified needs of people, it is necessary to use flat cables or computer extension cords. However, the existing flat cables or computer extension cords cannot emit light during work, and its working conditions may not be seen from outer surfaces of the flat cables or the computer extension cords, thus is not beneficial to use in dark light or at night. In addition, many Do-It-Yourself (DIY) computer assembly enthusiasts like to install various lamps on their own computers, so that the computers are visually appreciated due to different color assortments, whereas the existing flat cables or computer extension cords lack aesthetic sense. Therefore, it is necessary to design a better flat cable or computer extension cord, as to solve the above problems.

SUMMARY

In allusion to problems existing in existing technologies, the present application provides a luminescent wire that may emit light from one or more sides and may be used alone or in combination.

In order to achieve the above purpose, the present application adopts the following technical schemes.

A luminescent wire includes a silicone sleeve, a luminescent light bar and a flat cable, the silicone sleeve is internally provided with wire holes, the wire holes penetrate through the silicone sleeve along a longitudinal direction, each of the wire holes is used for one group of the flat cables to pass through, an end portion of the flat cable is connected to a plug or a socket, an accommodating hole is arranged above the wire holes, and used to accommodate the luminescent light bar, and the silicone sleeve is provided with a light transmitting area, as to transmit light emitted by the luminescent light bar to the light transmitting area.

Further, each of the silicone sleeves is provided with a plurality of the wire holes, and the plurality of the wire holes are arranged in a row along a horizontal direction.

Further, both ends of the silicone sleeve are provided with end caps, one end of the end cap is fixed to the silicone sleeve, the other end is provided with a through hole for the flat cable to pass through, the end cap includes a first end cap and a second end cap that are fixed to each other, and the through hole is arranged between the first end cap and the second end cap.

Further, one side, facing each other, of the first end cap and the second end cap is optionally provided with a clamping button or a clamping groove, and the clamping button is clamped in the clamping groove, as to fix the first end cap and the second end cap together.

Further, the surface, facing each other, of the first end cap and the second end cap is optionally provided with a convex column or a concave hole, and the convex column is inserted into the concave hole for positioning.

Further, each group of the flat cables includes a first flat cable located on an upper layer and a second flat cable located on a lower layer, the first flat cable passes through the through hole, and the second flat cable passes through the second end cap, and is integrally formed with an end face of the second end cap.

Further, a blocking bar is arranged in the middle of the first end cap and the second end cap, and while the first end cap or the second end cap is installed on the silicone sleeve, the blocking bar is blocked on an end face of the silicone sleeve.

Further, two or more silicone sleeves are arranged side by side along the horizontal direction, as to form various specifications in combination, and a plurality of the silicone sleeves are fixed together by the clamping buttons.

Further, the light transmitting area is arranged on a top surface or/and a bottom surface of the silicone sleeve, and may transmit light on one or both sides.

Further, the silicone sleeve is provided with the light transmitting area protruded, and other plane portions are non-light-transmitting.

Beneficial effects of the present application are as follows.

The flat cables inside each of the silicone sleeves may be used alone, or the plurality of the silicone sleeves may be selected to be used side by side, as to form different specifications of the luminescent wires. During production, one silicone sleeve specification may be selected for mass production. The silicone sleeve is provided with the light transmitting area, the light emitted by the luminescent light bar is transmitted to the light transmitting area, and the light may be emitted from one or more sides. Therefore, the luminescent wire may also be conveniently viewed and used in darker environments, and the computers may be more visually appreciated.

Figure 1:
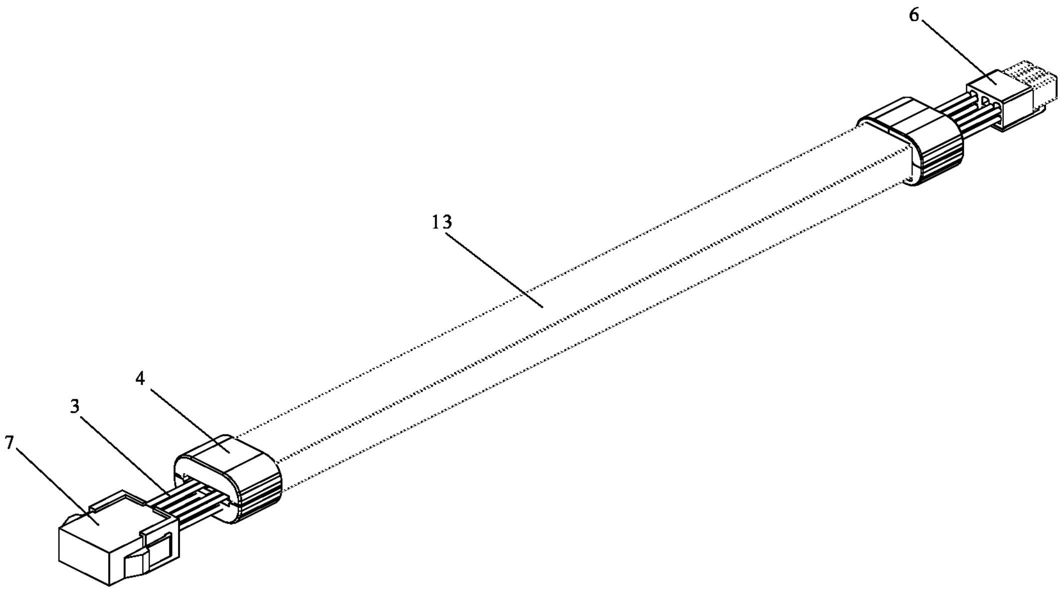
FIG. 1 is a structure schematic diagram of a luminescent wire in a first embodiment of the present application.

In the drawings: 1—Silicone sleeve, 11—Wire hole, 12—Accommodating hole, 13—Light transmitting area, 2—Luminescent light bar, 3—Flat cable, 31—First flat cable, 32—Second flat cable, 4—End cap, 41—First end cap, 42—Second end cap, 43—Through hole, 44—Clamping hook, 45—Clamping groove, 46—Convex column, 47—Concave hole, 48—Blocking bar, 5—Clamping button, 6—Plug, and 7—Socket.

DETAILED DESCRIPTION OF THE EMBODIMENTS

Technical schemes in embodiments of the present application are clearly and completely described below in combination with the drawings in the embodiments of the present application. Apparently, the embodiments described are only a part of the embodiments of the present application, not all of the embodiments. Based on the embodiments in the present application, all other embodiments obtained by those of ordinary skill in the art without creative labor shall fall within the scope of protection of the present application.

It should be noted that all directional indications (such as upper, lower, left, right, front, rear and the like) in the embodiments of the present application are only used to explain a relative position relationship, a movement situation and the like between various components in a certain specific posture (as shown in the drawings). If the specific posture changes, the directional indication also changes accordingly.

As shown in FIGS. 1 to 4, the present application provides a luminescent wire, the luminescent wire includes a silicone sleeve 1, a luminescent light bar 2 and a flat cable 3, the silicone sleeve 1 is internally provided with wire holes 11, the wire holes 11 penetrate through the silicone sleeve 1 along a longitudinal direction, each of the wire holes 11 is used for one group of the flat cables 3 to pass through, an end portion of the flat cable 3 is connected to a plug 6 or a socket 7, an accommodating hole 12 is arranged above the wire holes 11, and used to accommodate the luminescent light bar 2, and the silicone sleeve 1 is provided with a light transmitting area 13, as to transmit light emitted by the luminescent light bar 2 to the light transmitting area 13.

Preferably, each of the silicone sleeves 1 is provided with a plurality of the wire holes 11, and the plurality of the wire holes 11 are arranged in a row along a horizontal direction.

Figure 2:
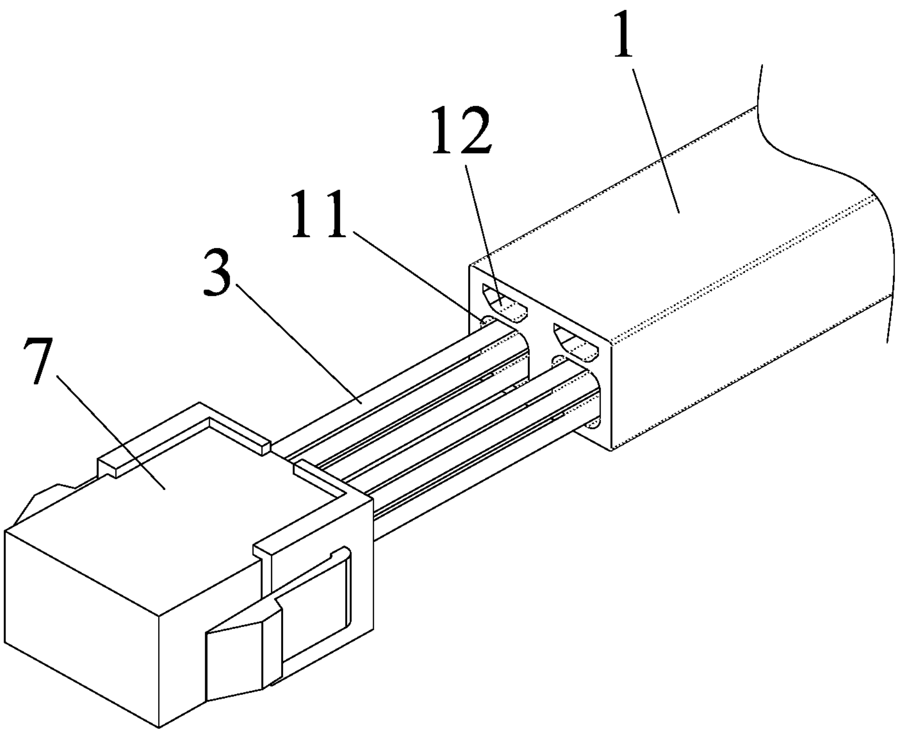
FIG. 2 is a local schematic diagram of an end portion of the luminescent wire in FIG. 1.
Figure 3:
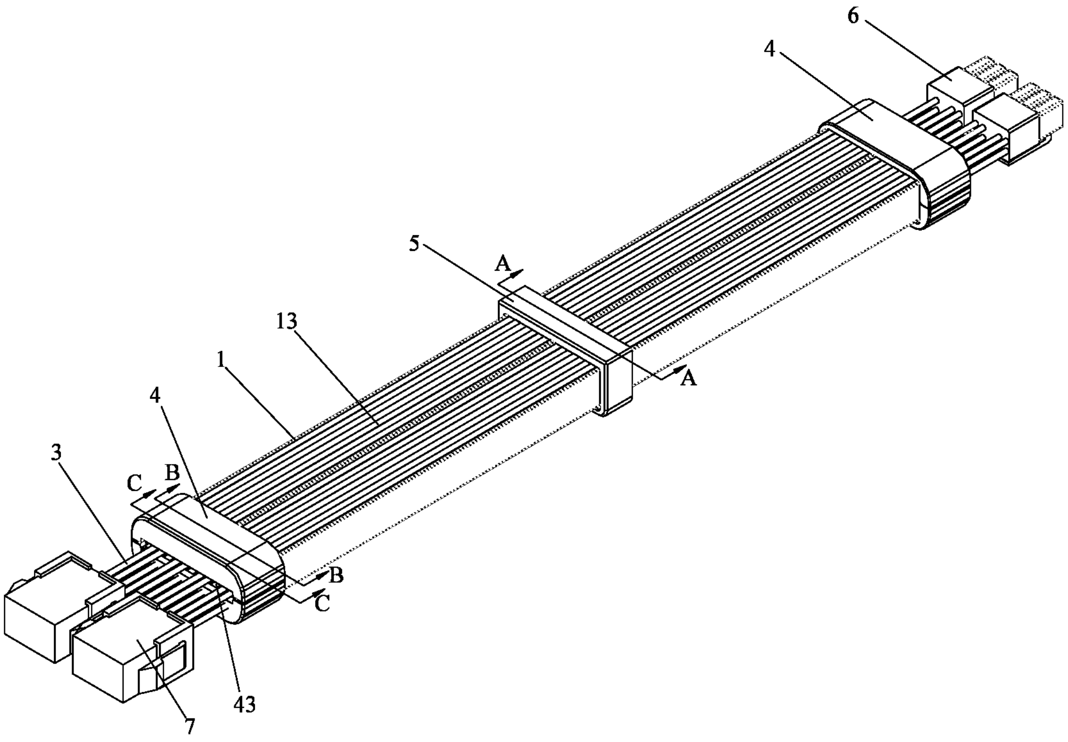
FIG. 3 is a structure schematic diagram of the luminescent wire in a second embodiment of the present application.
Figure 4:
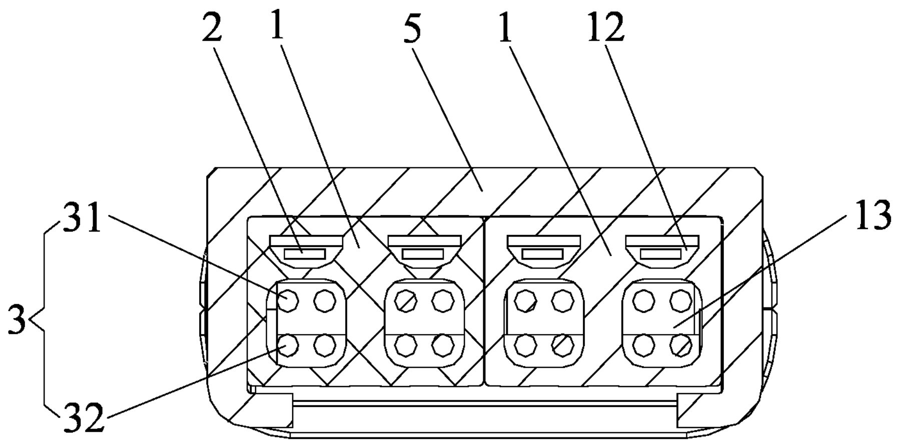
FIG. 4 is a cross-sectional view of A-A in FIG. 3.
Figure 5:
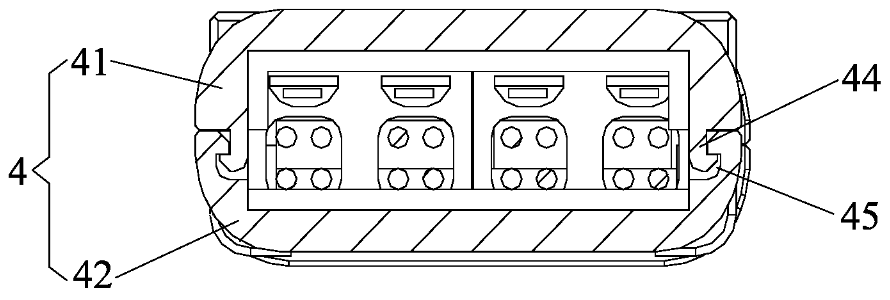
FIG. 5 is a cross-sectional view of B-B in FIG. 3.
Figure 6:
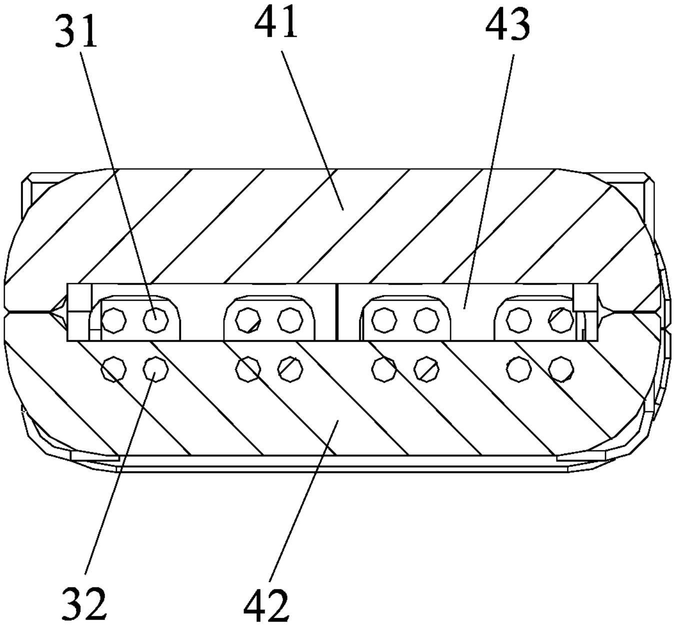
FIG. 6 is a cross-sectional view of C-C in FIG. 3.
Figure 7:
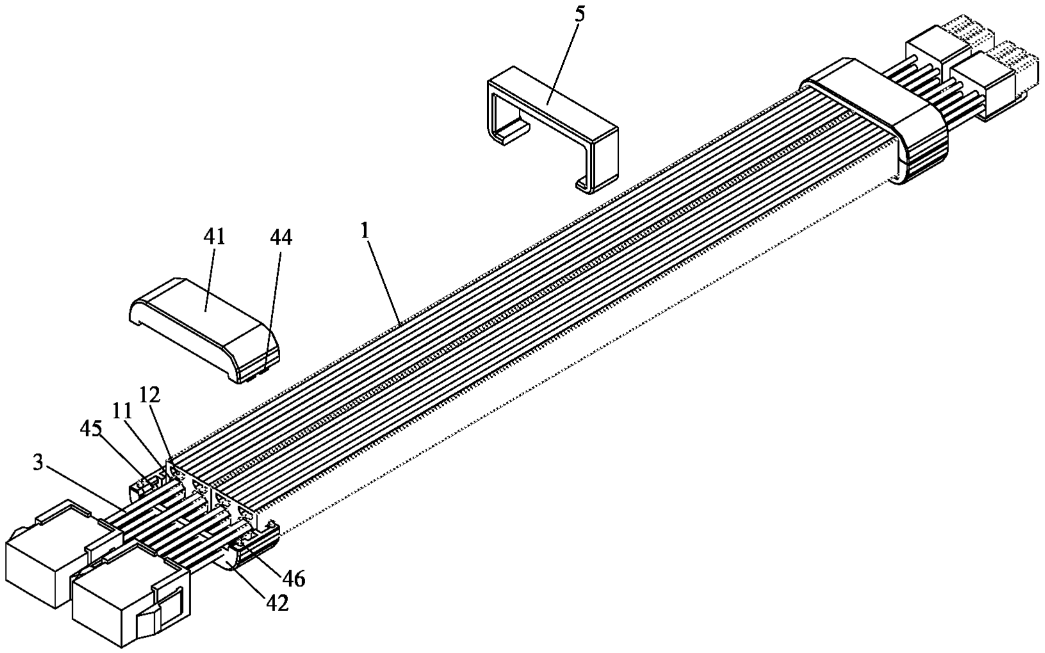
FIG. 7 is a partial exploded schematic diagram of the luminescent wire in the second embodiment of the present application.
Figure 8:
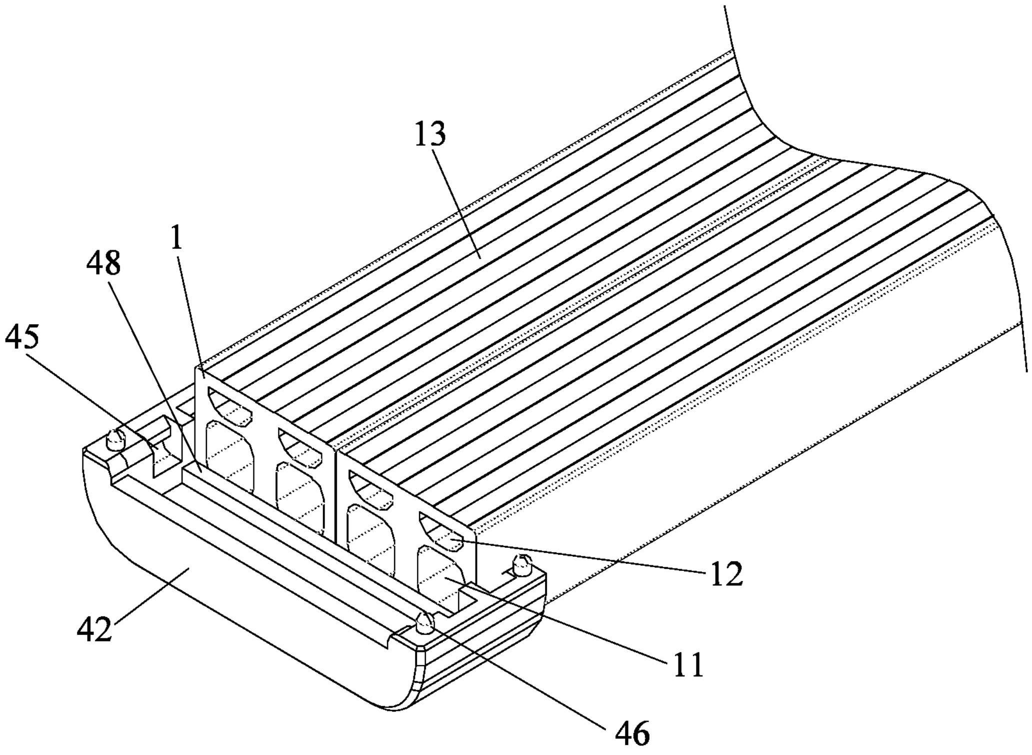
FIG. 8 is a schematic diagram of a second end cap in the luminescent wire in the second embodiment of the present application.

FIGS. 1 and 2 are structure schematic diagrams in a first embodiment of the present application. In this embodiment, there is one silicone sleeve 1 arranged, the silicone sleeve 1 is internally provided with two wire holes 11 which are arranged in a row along the horizontal direction, one group of the flat cables 3 passes through each of the wire holes 11, and there are four flat cables 3 in one group, including two first flat cables 31 located on an upper layer and two second flat cables 32 located on a lower layer. An end portion of one group of the flat cables 3 is connected with one plug 6 or socket 7, as to form a single luminescent wire of 8P specification.

FIGS. 2 to 8 are structure schematic diagrams of a second embodiment of the present application. Different from the first embodiment, in this embodiment, two silicone sleeves 1 are arranged side by side along the horizontal direction, as to form a luminescent wire of 2*8P specification, and two end portions of the flat cable 3 are respectively connected with two 8P plugs 6 and two 8P sockets 7. The two silicone sleeves 1 are fixed together by a clamping button 5, and the clamping button 5 is portal-shaped, has a certain degree of elasticity, and clamps the silicone sleeve 1 from top to bottom.

Two ends of the silicone sleeve 1 are provided with end caps 4, one end of the end cap 4 is fixed to the silicone sleeve 1, and the other end is provided with a through hole 43 for the flat cable 3 to pass through. Preferably, the end cap 4 includes a first end cap 41 and a second end cap 42 that are fixed to each other, and the through hole 43 is arranged between the first end cap 41 and the second end cap 42. One side, facing each other, of the first end cap 41 and the second end cap 42 is optionally provided with a clamping hook 44 and a clamping groove 45, and the clamping hook 44 is clamped in the clamping groove 45, as to fix the first end cap 41 and the second end cap 42 together. In this embodiment, the clamping hook 44 is arranged on a side edge of a bottom portion of the first end cap 41, and the clamping groove 45 is arranged on an edge of a top portion of the second end cap 42. While the first end cap 41 moves downwards to the second end cap 42, the clamping hook 44 is clamped into the clamping groove 45, as to achieve mutual fixation between the first end cap 41 and the second end cap 42.

Preferably, the surface, facing each other, of the first end cap 41 and the second end cap 42 is optionally provided with a convex column 46 and a concave hole 47, and the convex column 46 is inserted into the concave hole 47 for positioning. In this embodiment, four corners of a bottom surface of the first end cap 41 are respectively provided with the concave holes 47. Correspondingly, four corners of a top surface of the second end cap 42 are respectively provided with the convex columns 46, the guiding and positioning effect are achieved by cooperation of the convex columns 46 and the concave holes 47.

Preferably, a blocking bar 48 is arranged in the middle of the first end cap 41 and the second end cap 42, and while the first end cap 41 or the second end cap 42 is installed on the silicone sleeve 1, the blocking bar 48 is blocked on an end face of the silicone sleeve 1, thus it may be guaranteed that the relative position of the end cap 4 and the silicone sleeve 1 is fixed.

The first flat cable 31 passes through the through hole 43 between the first end cap 41 and the second end cap 42, and the second flat cable 32 passes through the second end cap 42 and is integrally formed with an end face of the second end cap 42. During processing, the second end cap 42 is firstly integrally formed on the second flat cable 32, then assembled on both ends of the silicone sleeve 1, and the second end cap 42 is clamped by the first end cap 41 from top to bottom, as to achieve the positioning effect of the silicone sleeve 1, the end cap 4, and the flat cable 3.

Figure 9:
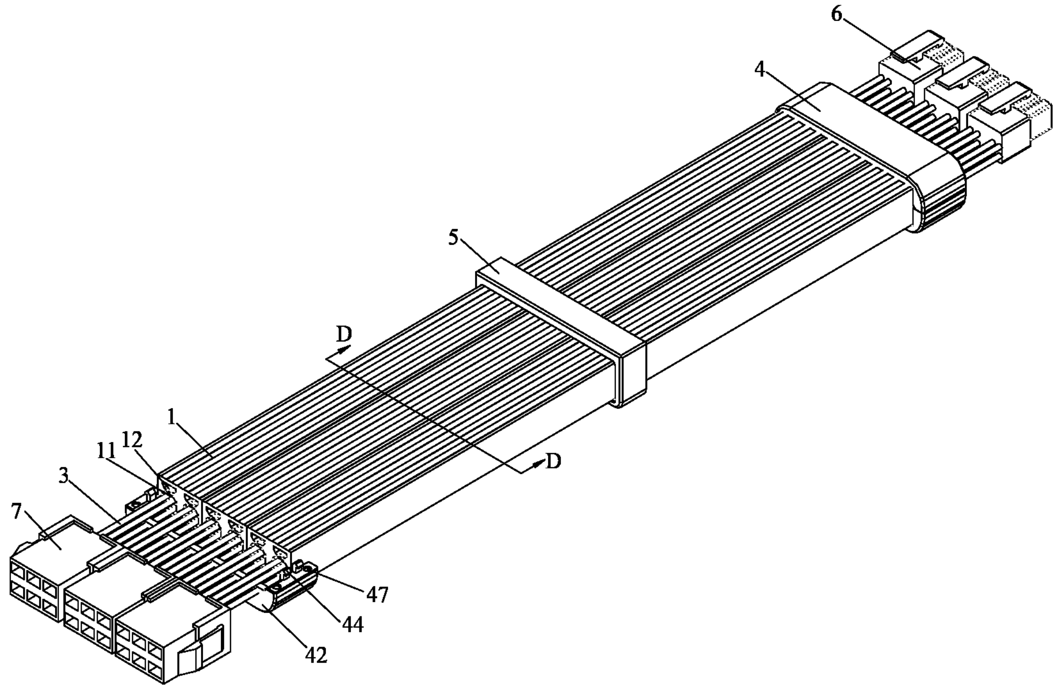
FIG. 9 is a structure schematic diagram of the luminescent wire in a third embodiment of the present application.
Figure 10:
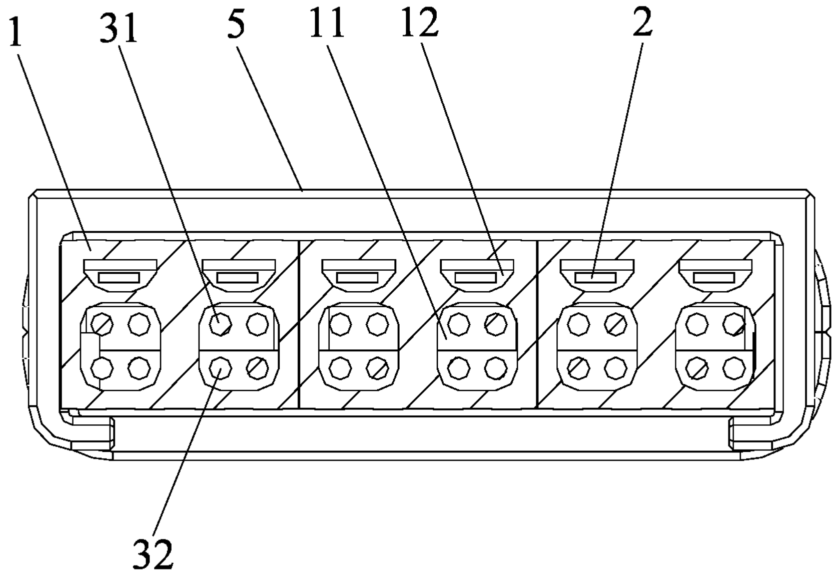
FIG. 10 is a cross-sectional view of D-D in FIG. 9.

As shown in FIGS. 9 and 10, it is a structure schematic diagram in a third embodiment of the present application. The structures of the silicone sleeve 1, the flat cable 3, and the end cap 4 in this embodiment are basically the same as that of the first and second embodiments, and the difference is that in this embodiment, three silicone sleeves 1 are arranged side by side along the horizontal direction, as to form a luminescent wire of 3*8P specification, two end portions of the flat cable 3 are respectively connected with three 8P plugs 6 and three 8P sockets 7, and middle portions of the three silicone sleeves 1 are also clamped by the clamping button 5.

In this embodiment, the arrangement directions of the clamping hook 44 and the clamping groove 45 are different from the second embodiment. The clamping hook 44 is arranged on the edge of the top surface of the second end cap 42, the clamping groove 45 is arranged on the edge of the bottom portion of the first end cap 41, and the clamping hook 44 and the clamping groove 45 are clamped mutually, as to achieve the fixation of the first end cap 41 and the second end cap 42. The arrangement positions of the convex column 46 and the concave hole 47 are also different. The convex columns 46 are arranged at the four corners of the bottom surface of the first end cap 41, the concave holes 47 are arranged at the four corners of the top surface of the second end cap 42, and the guiding and positioning effect are achieved by the cooperation of the convex columns 46 and the concave holes 47.

Figure 11:
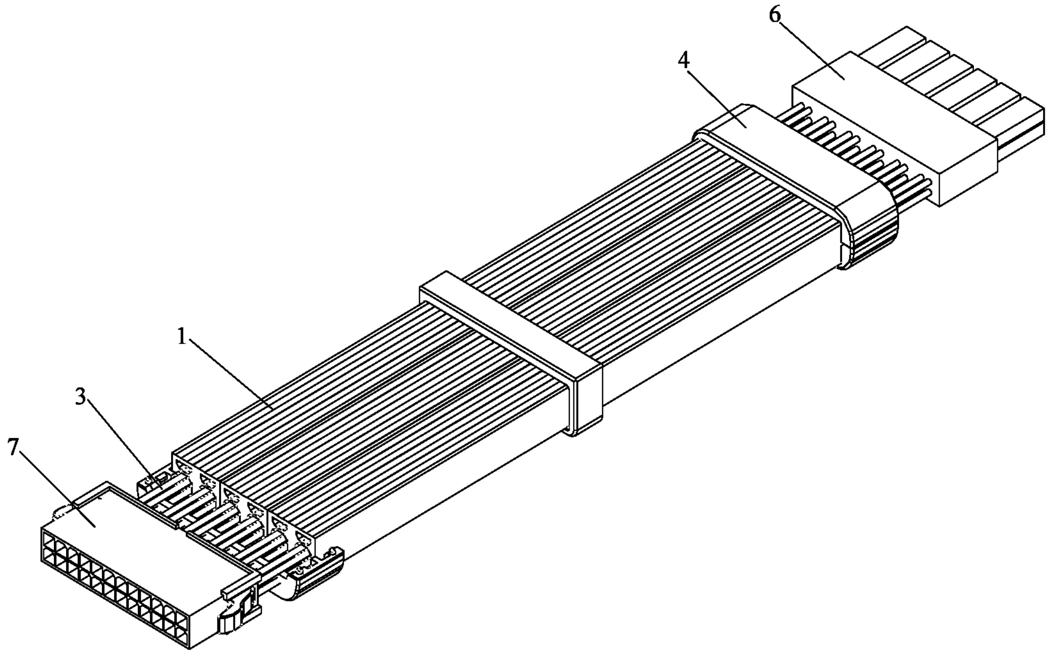
FIG. 11 is a structure schematic diagram of the luminescent wire in a fourth embodiment of the present application.

As shown in FIG. 11, it is a structure schematic diagram in a fourth embodiment of the present application. The structures of the silicone sleeve 1, the flat cable 3, and the end cap 4 in this embodiment are basically the same as that of the first and second embodiments. The difference is that in this embodiment, three silicone sleeves 1 are arranged side by side along the horizontal direction, as to form a luminescent wire of 24P specification, two end portions of the flat cable 3 are respectively connected with one 24P plug 6 and one 24P socket 7, and middle portions of the three silicone sleeves 1 are also clamped by the clamping button 5.

The silicone sleeve 1 of the present application is internally provided with a plurality of wire holes 11 arranged in a row, and each of the wire holes 11 is used for one group of the flat cables 3 to pass through. Therefore, the flat cables 3 inside each of the silicone sleeves 1 may be used alone, or the plurality of the silicone sleeves 1 may be selected to be used side by side, as to form different specifications of the luminescent wires. During production, one silicone sleeve 1 specification may be selected for mass production. In addition, with the diverse specifications, market requirements are satisfied.

The light transmitting area 13 is arranged on a top surface or/and a bottom surface of the silicone sleeve 1, and may transmit light on one or both sides. In this embodiment, the top surface and the bottom surface of the silicone sleeve 1 are provided with the plane light transmitting areas 13, and other surfaces are non-light-transmitting areas, thus the double-sided light transmission may be achieved. In another embodiment, a plurality of protruded light transmitting areas 13 may be arranged on the silicone sleeve 1 as a luminescent indicator, and other plane portions are non-light-transmitting.

The present application, by arranging the light transmitting area 13 on the silicone sleeve 1, utilizes its light-transmitting and non-transparent characteristics, so that the light emitted by the luminescent light bar 2 is transmitted to the light transmitting area 13, and the light may be emitted from one or more sides. Therefore, the luminescent wire may also be conveniently viewed and used in darker environments, and the computers may be more visually appreciated.

The above embodiments are only used to describe the technical schemes of the present application rather than limiting. Although the present application is described in detail with reference to preferred embodiments, those skilled in the art should understand that the technical scheme of the present application may be modified or equivalently replaced without departing from the purpose and scope of the technical scheme, and it should be all encompassed within the scope of the claims of the present application.

What is claimed is:

1. A luminescent wire, wherein the luminescent wire comprises a silicone sleeve, a luminescent light bar and a flat cable, the silicone sleeve is internally provided with wire holes, the wire holes penetrate through the silicone sleeve along a longitudinal direction, each of the wire holes is used for one group of the flat cables to pass through, an end portion of the flat cable is connected to a plug or a socket, an accommodating hole is arranged above the wire holes, and is used to accommodate the luminescent light bar, and the silicone sleeve is provided with a light transmitting area, as to transmit light emitted by the luminescent light bar to the light transmitting area;

wherein each of the silicone sleeves is provided with a plurality of the wire holes, and the plurality of the wire holes are arranged in a row along a horizontal direction.

2. The luminescent wire as claimed in claim 1, wherein both ends of the silicone sleeve are provided with end caps, one end of the end cap is fixed to the silicone sleeve, the other end is provided with a through hole for the flat cable to pass through, the end cap comprises a first end cap and a second end cap that are fixed to each other, and the through hole is arranged between the first end cap and the second end cap.

3. The luminescent wire as claimed in claim 2, wherein one side, facing each other, of the first end cap and the second end cap is optionally provided with a clamping hook and a clamping groove, and the clamping hook is clamped in the clamping groove, as to fix the first end cap and the second end cap together.

4. The luminescent wire as claimed in claim 2, wherein the surface, facing each other, of the first end cap and the second end cap is optionally provided with a convex column and a concave hole, and the convex column is inserted into the concave hole for positioning.

5. The luminescent wire as claimed in claim 2, wherein each group of the flat cables comprises a first flat cable located on an upper layer and a second flat cable located on a lower layer, the first flat cable passes through the through hole, and the second flat cable passes through the second end cap, and is integrally formed with an end face of the second end cap.

6. The luminescent wire as claimed in claim 2, wherein a blocking bar is arranged in the middle of the first end cap and the second end cap, and while the first end cap or the second end cap is installed on the silicone sleeve, the blocking bar is blocked on an end face of the silicone sleeve.

7. The luminescent wire as claimed in claim 1, wherein two or more silicone sleeves are arranged side by side along the horizontal direction, as to form various specifications in combination, and a plurality of the silicone sleeves are fixed together by a clamping hook.

8. The luminescent wire as claimed in claim 1, wherein the light transmitting area is arranged on a top surface or/and a bottom surface of the silicone sleeve, and may transmit light on one or both sides.

* * * * *